US012432552B2

United States Patent
Wifvesson et al.

(10) Patent No.: US 12,432,552 B2
(45) Date of Patent: Sep. 30, 2025

(54) HANDLING APPLICATION FUNCTIONS FOR KEY MANAGEMENT IN COMMUNICATION DEVICE-NETWORK RELAY SCENARIOS

(71) Applicant: Telefonaktiebolaget LM Ericsson (publ), Stockholm (SE)

(72) Inventors: Monica Wifvesson, Lund (SE); Zhang Fu, Stockholm (SE); Vesa Lehtovirta, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/030,895

(22) PCT Filed: Oct. 26, 2021

(86) PCT No.: PCT/EP2021/079700
§ 371 (c)(1),
(2) Date: Apr. 7, 2023

(87) PCT Pub. No.: WO2022/090239
PCT Pub. Date: May 5, 2022

(65) Prior Publication Data
US 2023/0397000 A1     Dec. 7, 2023

Related U.S. Application Data

(60) Provisional application No. 63/108,082, filed on Oct. 30, 2020.

(51) Int. Cl.
H04W 8/00     (2009.01)
H04L 9/08     (2006.01)
(Continued)

(52) U.S. Cl.
CPC ....... *H04W 12/0433* (2021.01); *H04L 9/0819* (2013.01); *H04W 12/037* (2021.01)

(58) Field of Classification Search
CPC ........... H04W 12/0433; H04W 12/037; H04W 8/005; H04W 76/14; H04W 88/04; H04W 12/043; H04L 9/0819
See application file for complete search history.

(56) References Cited

U.S. PATENT DOCUMENTS

2022/0303254 A1*   9/2022  Guo .................... H04L 63/0435

OTHER PUBLICATIONS

3rd Generation Partnership Project (3GPP), TR 33.847 V0.2.0: Study on Security Aspects of Enhancement for Proximity Based Services in 5GS, Oct. 2020. 3GPP, Version 0.2.0, pp. 1-18 (Year: 2020).*

(Continued)

*Primary Examiner* — Joseph P Hirl
*Assistant Examiner* — Aayush Aryal
(74) *Attorney, Agent, or Firm* — Sage Patent Group

(57) ABSTRACT

A remote communication device can receive a discovery key; receive a communication key and a key identifier, ID, for the communication key; and discover a relay communication device. Discovering the relay communication device can include receiving an encrypted discovery message from the relay communication device and decrypting the encrypted discovery message using the discovery key. The remote communication device can further transmit a direct communication request to the relay communication device responsive to receiving and decrypting the encrypted discovery message from the relay communication device. The direct communication request can include the key ID for the communication key. The remote communication device can further receive an encrypted direct communication response from the relay communication device. Receiving the (Continued)

encrypted direct communication response can include decrypting the encrypted direct communication response.

26 Claims, 7 Drawing Sheets

(51) Int. Cl.
    *H04W 12/037*    (2021.01)
    *H04W 12/043*    (2021.01)
    *H04W 12/0433*   (2021.01)
    *H04W 76/14*     (2018.01)
    *H04W 88/04*     (2009.01)

(56) References Cited

OTHER PUBLICATIONS

International Search Report and Written Opinion of the International Searching Authority, PCT/EP2021/079700, mailed Jan. 25, 2022, 10 pages.
3GPP TR 33.847 v0.2.0 (Oct. 2020); 3rd Generation Partnership Project; Technical Specification Group Services and System Aspects; Study on security aspects of enhancements for proximity based services in the 5G System (5GS) (Release 17); 45 pages.
3GPP TS 33.303 v16.0.0 (Jul. 2020); 3rd Generation Partnership Project; Technical Specification Group Services and System Aspects; Proximity-based Services (ProSe); Security aspects (Release 16); 90 pages.
International Preliminary Report on Patentability of the International Preliminary Examining Authority, PCT/EP2021/079700, mailed Oct. 4, 2022, 10 pages.
3GPP TS 23.401 v16.8.0 (Sep. 2020); 3rd Generation Partnership Project; Technical Specification Group Services and System Aspects; General Packet Radio Service (GPRS) enhancements for Evolved Universal Terrestrial Radio Access NetWork (E-UTRAN) access (Release 16); 440 pages.
3GPP TS 23.501 v16.6.0 (Sep. 2020); 3rd Generation Partnership Project; Technical Specification Group Services and System Aspects; System architecture for the 5G System (5GS); Stage 2 (Release 16); 447 pages.
3GPP TR 23.752 v0.5.0 (Sep. 2020); 3rd Generation Partnership Project; Technical Specification Group Services and System Aspects; Study on system enhancements for Proximity based Services (ProSe) in the 5G System (5GS) (Release 17); 161 pages.
3GPP TS 33.220 v16.2.0 (Sep. 2020); 3rd Generation Partnership Project; Technical Specification Group Services and System Aspects; Generic Authentication Architecture (GAA); Generic Bootstrapping Architecture (GBA) (Release 16); 93 pages.
3GPP TS 33.501 v16.4.0 (Sep. 2020); 3rd Generation Partnership Project; Technical Specification Group Services and System Aspects; Security architecture and procedures for 5G system (Release 16); 250 pages.
3GPP TS 33.535 v16.1.0 (Sep. 2020); 3rd Generation Partnership Project; Technical Specification Group Services and System Aspects; Authentication and Key Management for Applications (AKMA) based on 3GPP credentials in the 5G System (5GS) (Release 16); 19 pages.
Ericsson, "ProSe: Key management server(s) in UE-to-network relay scenarios," 3GPP TSG-SA-3 Meeting #101-e, S3-203373, e-meeting, Nov. 9-20, 2020, 3 pages.

\* cited by examiner

HANDLING APPLICATION FUNCTIONS FOR KEY MANAGEMENT IN COMMUNICATION DEVICE-NETWORK RELAY SCENARIOS

CROSS REFERENCE TO RELATED APPLICATIONS

This application is a 35 U.S.C. § 371 national stage application of PCT International Application No. PCT/EP2021/079700 filed on Oct. 26, 2021, which in turn claims domestic priority to U.S. Provisional Patent Application No. 63/108,082, filed on Oct. 30, 2020, the disclosures and content of which are incorporated by reference herein in their entirety.

TECHNICAL FIELD

The present disclosure relates generally to communications, and more particularly to communication methods and related devices and nodes supporting wireless communications.

BACKGROUND

Proximity services ("ProSe") in $4^{th}$ generation ("4G") systems are described below. A ProSe user equipment ("UE")-to-network relay procedures in a 4G system can include two distinct phases: a discovery phase (e.g., the discovery of a UE-to-network relay) and a communication phase (e.g., communication between a remote UE and the UE-to-network relay). The security of the communication between a remote UE and a UE-to-network relay can use a procedure to establish the security context and protect the actual communication. The part of the security establishment that is specific to the UE-to-network relay use case is the establishment of the shared-key key distributor ("KD"). FIG. 1 is a signal flow diagram illustrating operations in a UE-to-network relay security procedure.

Following the general sequence of flows for public safety one to one communication, a shared key KD may need to be established. This key can serve to derive session keys between the remote UE and the UE-to-network relay.

In order to generate KD, the remote UE may need a ProSe Relay User Key ("PRUK") and an associated 64-bit PRUK identifier ("ID") from a ProSe key management function ("PKMF"). The PRUK ID can be used to identify the PRUK to the PKMF of the UE-to-network relay. The PRUK can be used to generate the shared key KD for any of the relays under a particular PKMF. Accordingly, only one PRUK for each remote UE may be needed from a particular PKMF. This PRUK needs to be fetched by the remote UE while it is still in coverage. This implies that the remote UE must contact all the PKMFs of any potential relays it wants to be able to use.

The remote UE can fetch its PRUK from the PKMF using a Key Request/Response message or may receive one through a generic bootstrapping architecture ("GBA") push function as part of establishing the communication with the relay. The UE-to-network relay can fetch the KD that will be used to secure the communication by sending the PRUK ID or international mobile subscriber identity ("IMSI") (e.g., if the remote UE does not have a PRUK for the relay or the supplied PRUK has been rejected) to its PKMF. At the PKMF side, the corresponding PRUK is retrieved. The KD is then derived from the PRUK using a KD Freshness Parameter (a locally generated random number), which the PKMF then passes to the remote UE via the UE-to-network relay, a nonce sent by the remote UE via the UE-to-network relay, and the Relay Service Code the Remote UE wishes to access. The UE-to-network relay receives the KD and the KD Freshness Parameter, and stores the KD. Having obtained the KD Freshness Parameter, the UE-to-network relay enables the remote UE to derive the same KD as the KD derived by the PKMF.

If the remote UE receives a new PRUK in a Key Response message, it can delete any previous PRUK for that PKMF. If it receives a new one through a GBA PUSH message, it can overwrite any PRUK received through a GBA PUSH message that has not been successfully used to establish a relay connection. Once a PRUK received through a GBA PUSH Message has been used to calculate a KD for a successful relay connection establishment, the remote UE can delete any previous PRUKs for this PKMF.

Configuration in a UE for ProSe in a $5^{th}$ generation ("5G") systems is described below. User Plane Based Architecture proposes to adopt functions of ProSe Function into 5G system architectures. In some examples, the Direct Discovery Name Management Function ("DDNMF") and Direct Provisioning Function ("DPF") of a ProSe Function may be useful/necessary to support ProSe in 5G system architectures. A DPF can be used to provision the UE with necessary parameters in order to use 5G ProSe Direct Discovery and 5G Prose Direct Communication, which can be replaced by a policy control function ("PCF"). DDNMF can be used to provide the following procedures over a PC3 interface: a Discovery Request/Response Procedure; a Match Report Procedure; an Announcing Alert Procedure; and/or a Discovery Update Procedure.

A Discovery Request/Response Procedure can provide IDs and filter for direct discovery. A Match Report Procedure can check direct discovery and provide mapping information for direct discovery. An Announcing Alert Procedure can Support 'On-demand' ProSe Direct Discovery in case of ProSe restricted discovery model A. A Discovery Update Procedure can update/revoke previously allocated IDs, filters.

5G Systems ("5GS") can support Service-Based Architecture ("SBA"), and DDNMF can be a network function ("NF") that is not only able to interact with 5G NFs (e.g., to consume Nudm service operation) but also connects with a UE via user plane connectivity for support procedures over a power class 3 ("PC3") interface. In the architecture, it is proposed to introduce 5G DDNMF as shown in FIG. 2, which illustrates the proposed 5G System Architecture for ProSe.

5G DDNMF can be managed by a mobile network operator ("MNO"). 5G DDNMF can consume service operation from other NFs in 5GC (e.g., Nudm or Npcf).

A PC3 interface can support a Discovery Request/Response, a Match Report Procedure, an Announcing Alert Procedure, and a Discovery Update Procedure as following baseline features. Which network slice selection assistance information ("NSSAI") or data network name ("DNN") is to be used for user plane connectivity for a PC3 interface is up to a MNO's configuration (e.g., it can be controlled by a UE route selection policy ("URSP") or local configuration in the UE).

A UE-to-Network Relay is described below. The 3 rd generation partnership project ("3GPP") has not determined a solution for UE-to-Network Relay in 5GS. In 4G (evolved packet system ("EPS")), the use case of a UE-to-Network Relay was for public safety only. But in 5GS, UE-to-Network Relay applies to both public safety and commercial use cases.

SUMMARY

According to some embodiments, a method of operating a remote communication device is provided. The method includes receiving a discovery key. The method further includes receiving a communication key and a key identifier, ID, for the communication key. The method further includes discovering a relay communication device. Discovering the relay communication device includes receiving an encrypted discovery message from the relay communication device and decrypting the encrypted discovery message using the discovery key. The method further includes transmitting a direct communication request to the relay communication device responsive to receiving and decrypting the encrypted discovery message from the relay communication device. The direct communication request includes the key ID for the communication key. The method further includes receiving an encrypted direct communication response from the relay communication device. Receiving the encrypted direct communication response includes decrypting the encrypted direct communication response.

According to other embodiments, a method of operating a relay communication device is provided. The method includes receiving a discovery key. The method further includes transmitting an encrypted discovery message. The encrypted discovery message is encrypted using the discovery key. The method further includes receiving a direct communication request from a remote communication device. The direct communication request includes a key ID. The method further includes obtaining a communication key corresponding to the key ID from the direct communication request. The method further includes transmitting an encrypted direct communication response to the remote communication device. The encrypted direct communication response is encrypted using the communication key corresponding to the key ID.

According to other embodiments, a method of operating an Application Function node (AF-1) associated with a remote communication device is provided. The method includes receiving a key request message for discovery from the remote communication device. The key request message includes a relay service code. The method further includes obtaining a discovery key based on the relay service code included in the key request message for discovery. The method further includes transmitting a key response message for discovery including the discovery key to the remote communication device.

According to other embodiments, a method of operating an Application Function node (AF-2) associated with a relay communication device is provided. The method includes receiving a key request message for discovery from the relay communication device. The key request message includes a relay service code. The method further includes obtaining a discovery key based on the relay service code included in the key request message for discovery. The method further includes transmitting a key response message for discovery including the discovery key to the relay communication device.

According to other embodiments, an entity (e.g., remote communication device, a relay communication device, an application function node (e.g., AF-1 or AF-2), a computer program, or computer program code is provided and configured to perform at least one of the methods above.

Various embodiments herein allow a remote UE to communicate with a UE-to-network relay to retrieve discovery keys for a specific relay service code and to retrieve keys for PC5 communication.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 4:
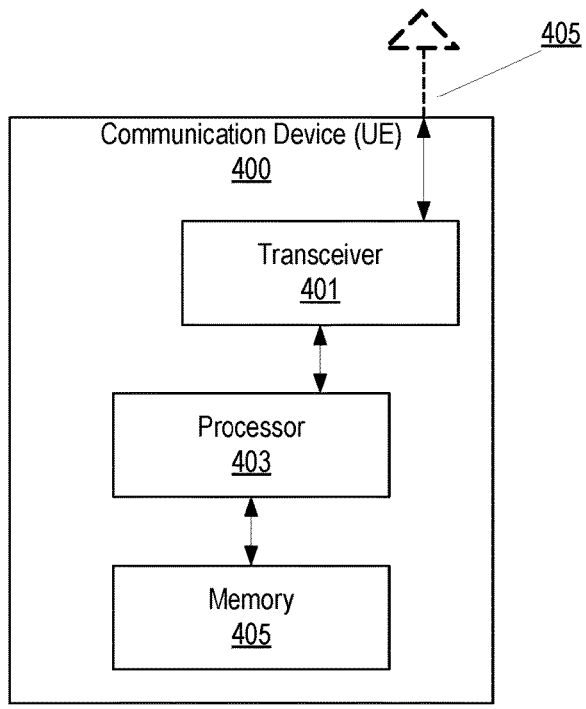
FIG. 4 is a block diagram illustrating a wireless device UE according to some embodiments of inventive concepts.

FIG. 4 is a block diagram illustrating elements of a communication device UE 400 (also referred to as a mobile terminal, a mobile communication terminal, a wireless device, a wireless communication device, a wireless terminal, mobile device, a wireless communication terminal, user equipment, UE, a user equipment node/terminal/device, etc.) configured to provide wireless communication according to embodiments of inventive concepts. As shown, communication device UE may include an antenna 407, and transceiver circuitry 401 (also referred to as a transceiver) including a transmitter and a receiver configured to provide uplink and downlink radio communications with a base station(s) (also referred to as a RAN node) of a radio access network. Communication device UE may also include processing circuitry 403 (also referred to as a processor) coupled to the transceiver circuitry, and memory circuitry 405 (also referred to as memory) coupled to the processing circuitry. The memory circuitry 405 may include computer readable program code that when executed by the processing circuitry 403 causes the processing circuitry to perform operations according to embodiments disclosed herein. According to other embodiments, processing circuitry 403 may be defined to include memory so that separate memory circuitry is not required. Communication device UE may also include an interface (such as a user interface) coupled with processing circuitry 403, and/or communication device UE may be incorporated in a vehicle.

As discussed herein, operations of communication device UE may be performed by processing circuitry 403 and/or transceiver circuitry 401. For example, processing circuitry 403 may control transceiver circuitry 401 to transmit communications through transceiver circuitry 401 over a radio interface to a radio access network node (also referred to as a base station) and/or to receive communications through transceiver circuitry 401 from a RAN node over a radio interface. Moreover, modules may be stored in memory circuitry 405, and these modules may provide instructions so that when instructions of a module are executed by processing circuitry 403, processing circuitry 403 performs respective operations (e.g., operations discussed below with respect to Example Embodiments relating to wireless communication devices). According to some embodiments, a communication device UE 400 and/or an element(s)/function(s) thereof may be embodied as a virtual node/nodes and/or a virtual machine/machines.

Figures 5, 6:
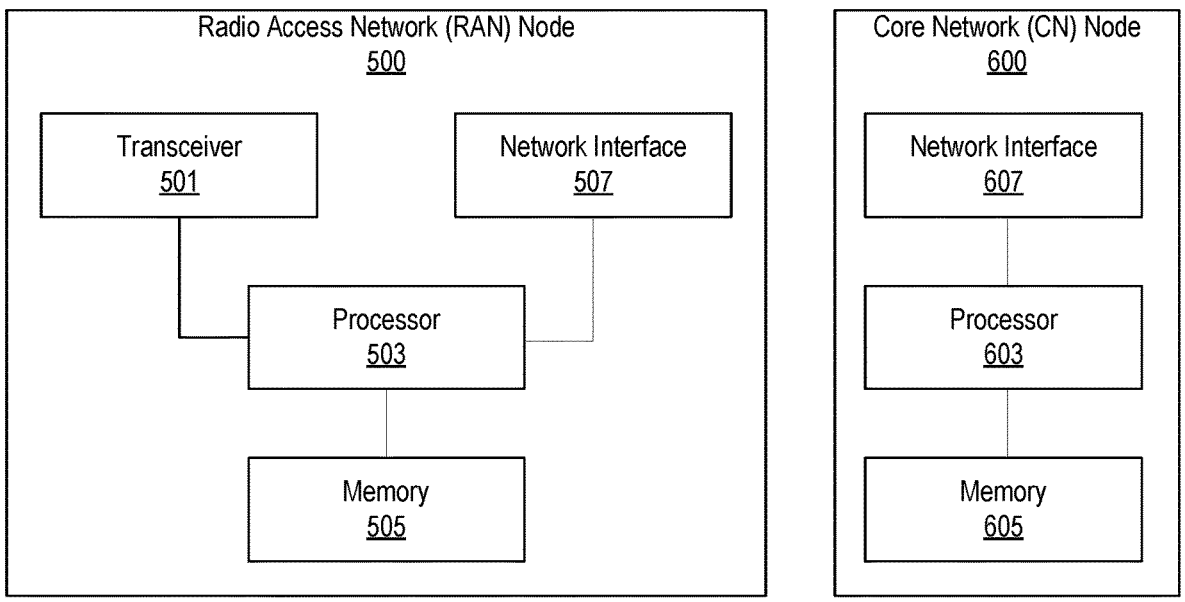
FIG. 5 is a block diagram illustrating a radio access network RAN node (e.g., a base station eNB/gNB) according to some embodiments of inventive concepts.
FIG. 6 is a block diagram illustrating a core network CN node (e.g., an AMF node, an SMF node, etc.) according to some embodiments of inventive concepts.

FIG. 5 is a block diagram illustrating elements of a radio access network RAN node 500 (also referred to as a network node, base station, eNodeB/eNB, gNodeB/gNB, etc.) of a Radio Access Network (RAN) configured to provide cellular communication according to embodiments of inventive concepts. As shown, the RAN node may include transceiver circuitry 501 (also referred to as a transceiver) including a transmitter and a receiver configured to provide uplink and downlink radio communications with mobile terminals. The RAN node may include network interface circuitry 507 (also referred to as a network interface) configured to provide communications with other nodes (e.g., with other base stations) of the RAN and/or core network CN. The network node may also include processing circuitry 503 (also referred to as a processor) coupled to the transceiver circuitry, and memory circuitry 505 (also referred to as memory) coupled to the processing circuitry. The memory circuitry 505 may include computer readable program code that when executed by the processing circuitry 503 causes the processing circuitry to perform operations according to embodiments disclosed herein. According to other embodiments, processing circuitry 503 may be defined to include memory so that a separate memory circuitry is not required.

As discussed herein, operations of the RAN node may be performed by processing circuitry 503, network interface 507, and/or transceiver 501. For example, processing circuitry 503 may control transceiver 501 to transmit downlink communications through transceiver 501 over a radio interface to one or more mobile terminals UEs and/or to receive uplink communications through transceiver 501 from one or more mobile terminals UEs over a radio interface. Similarly, processing circuitry 503 may control network interface 507 to transmit communications through network interface 507 to one or more other network nodes and/or to receive communications through network interface from one or more other network nodes. Moreover, modules may be stored in memory 505, and these modules may provide instructions so that when instructions of a module are executed by processing circuitry 503, processing circuitry 503 performs respective operations (e.g., operations discussed below with respect to Example Embodiments relating to RAN nodes). According to some embodiments, RAN node 500 and/or an element(s)/function(s) thereof may be embodied as a virtual node/nodes and/or a virtual machine/machines.

According to some other embodiments, a network node may be implemented as a core network CN node without a transceiver. In such embodiments, transmission to a wireless communication device UE may be initiated by the network node so that transmission to the wireless communication device UE is provided through a network node including a transceiver (e.g., through a base station or RAN node). According to embodiments where the network node is a RAN node including a transceiver, initiating transmission may include transmitting through the transceiver.

FIG. 6 is a block diagram illustrating elements of a core network CN node (e.g., an SMF node, an AMF node, etc.) of a communication network configured to provide cellular communication according to embodiments of inventive concepts. As shown, the CN node may include network interface circuitry 607 (also referred to as a network interface) configured to provide communications with other nodes of the core network and/or the radio access network RAN. The CN node may also include a processing circuitry 603 (also referred to as a processor) coupled to the network interface circuitry, and memory circuitry 605 (also referred to as memory) coupled to the processing circuitry. The memory circuitry 605 may include computer readable program code that when executed by the processing circuitry 603 causes the processing circuitry to perform operations according to embodiments disclosed herein. According to other embodiments, processing circuitry 603 may be defined to include memory so that a separate memory circuitry is not required.

As discussed herein, operations of the CN node may be performed by processing circuitry 603 and/or network interface circuitry 607. For example, processing circuitry 603 may control network interface circuitry 607 to transmit communications through network interface circuitry 607 to one or more other network nodes and/or to receive communications through network interface circuitry from one or more other network nodes. Moreover, modules may be stored in memory 605, and these modules may provide instructions so that when instructions of a module are executed by processing circuitry 603, processing circuitry 603 performs respective operations (e.g., operations discussed below with respect to Example Embodiments relating to core network nodes). According to some embodiments, CN node 600 and/or an element(s)/function(s) thereof may be embodied as a virtual node/nodes and/or a virtual machine/machines.

In some embodiments, a UE, RAN node, and/or CE node can be referred to as an entity (e.g., a network entity).

In 4GS, the scenario of a Remote UE accessing a 3GPP network via a UE-to-Network Relay using a PC5 interface was defined for Public Safety services only. Commercial services were never in the scope of 4GS.

In 5GS, the UE-to-network relay is defined for both Public Safety and commercial service.

In 5GS, for commercial services, the Remote UE does not know beforehand which UE-to-Network Relay it can find in its vicinity. It is not described for commercial services how the Remote UE and the UE-to-Network Relay retrieves the common security keys used for discovery of a UE-to-Network Relay over a PC5 interface and how the UE retrieves the common security keys used for PC5 communication with a UE-to-Network Relay over a PC5 interface.

According to some embodiments of inventive concepts, an approach is provided for commercial services. In such embodiments, the Remote UE and the UE-to-network Relay have no knowledge of each other beforehand.

According to some embodiments of inventive concepts, the Remote UE and the UE-to-network relay finds the address of the key management server(s) (AF(s)) to be able to discover each other and communicate over a PC5 interface According to some embodiments of inventive concepts, the Remote UE has an associated AF (AF-1 in FIGS. 3A-B) in its home PLMN for ProSe key management. The UE-to-network relay has an associated AF (AF-2 in FIGS. 3A-B) in its home PLMN for ProSe key management. These two AF's (AF-1 and AF-2 in FIGS. 3A-B) can be located in the same or different PLMN's and can communicate with each other. In some examples, one or more of the AFs (AF-1 and/or AF-2) can include a PKMF.

According to some embodiments of inventive concepts, the Remote UE gets the Relay Service Code and the address of the AF in its home PLMN (AF-1 (Remote UE)) from the home 5G DNNMF of the Remote UE.

According to some embodiments of inventive concepts, the UE-to-network Relay gets the address of the AF in its home PLMN (AF-2 (UE-to-network relay)) from the home 5G DNNMF of the UE-to-network relay.

According to some embodiments of inventive concepts, the UE retrieves the discovery keys corresponding to the Relay Service Code by accessing the AF-1 (Remote UE) which connects to the AF-2 (UE-to-network relay) who provides the discovery keys corresponding to the Relay Service Code to the UE via the AF-1 (Remote UE).

According to some embodiments of inventive concepts as an option, all AF's (e.g. AF-1 (Remote UE), AF-2 (UE-to-network relay), AF-3 etc.) could share the same algorithm to generate the discovery key for the same relay service code.

According to some embodiments of inventive concepts, when the Remote UE has discovered a UE-to-network relay in its vicinity, it either sends the address of the AF-1 (Remote UE) explicitly on the PC5 interface or includes the address of the AF-1 (Remote UE) in the Remote UE information (e.g., as described in solution #6 in TR 23.752 Reference [4]) sent on PC5 interface, to the UE-to-network relay.

Figure 1:
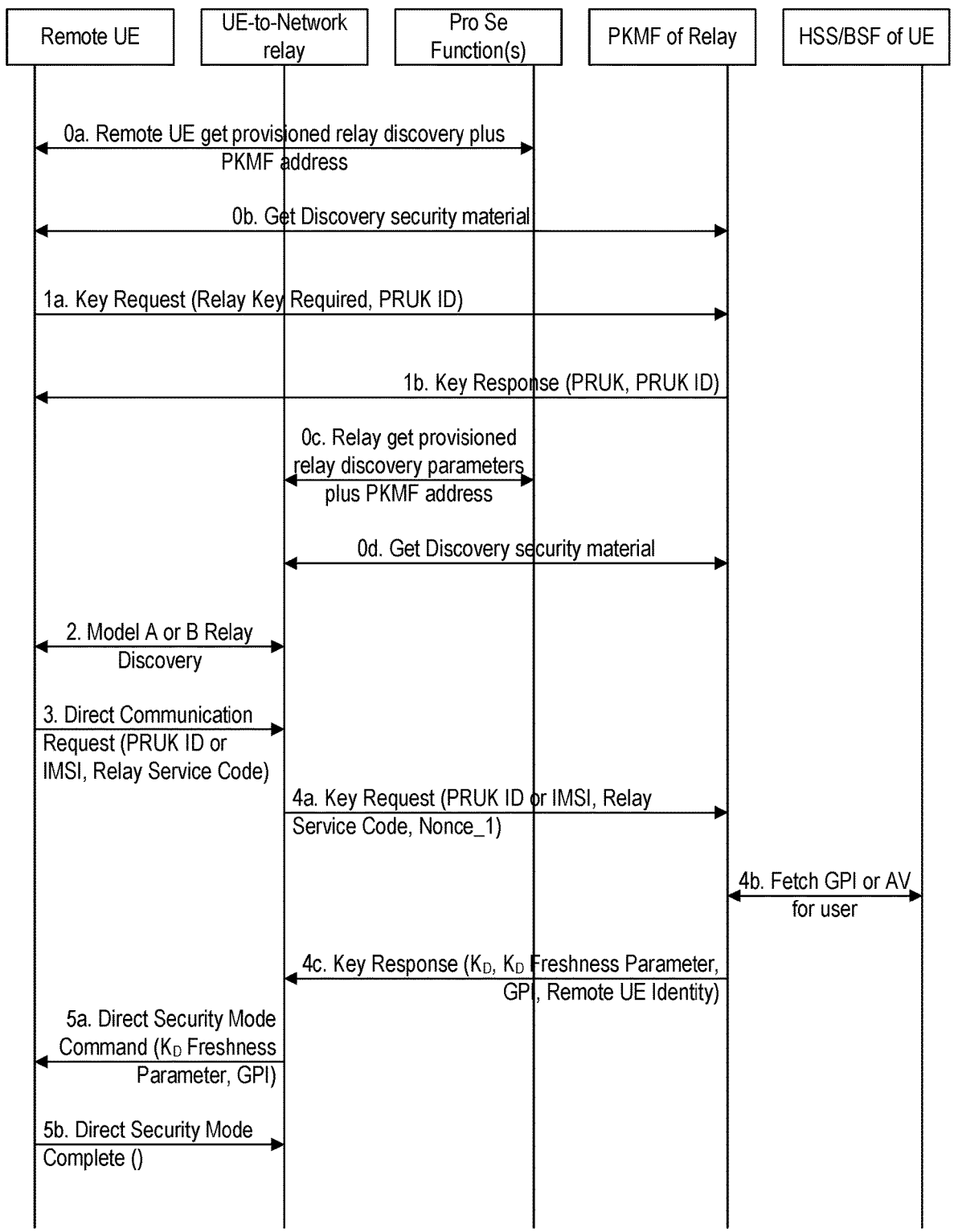
FIG. 1 is a message diagram illustrating UE-to-network relay security flows.
Figure 2:
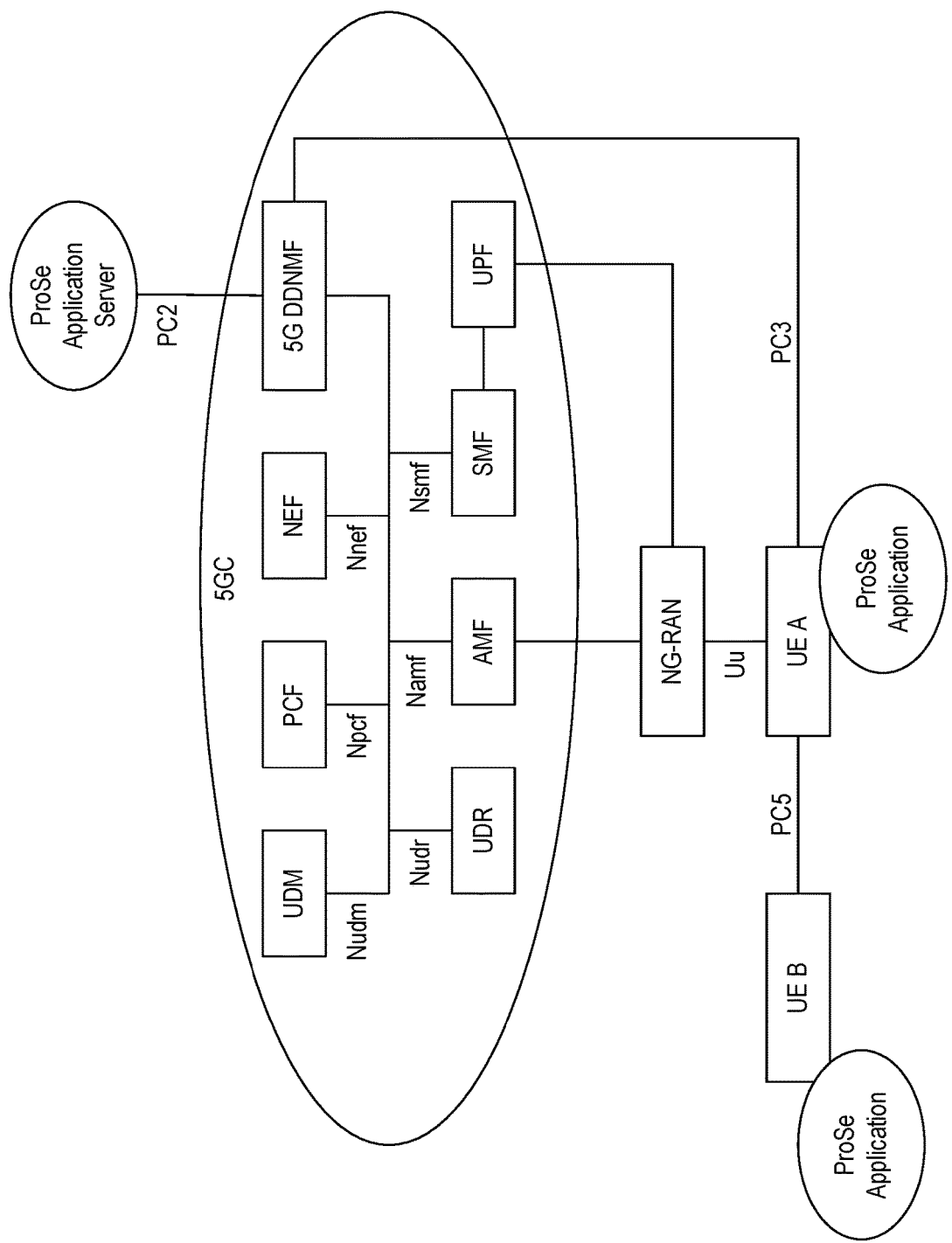
FIG. 2 is a block diagram illustrating a proposed 5G system architecture for ProSe.
Figure 3A:
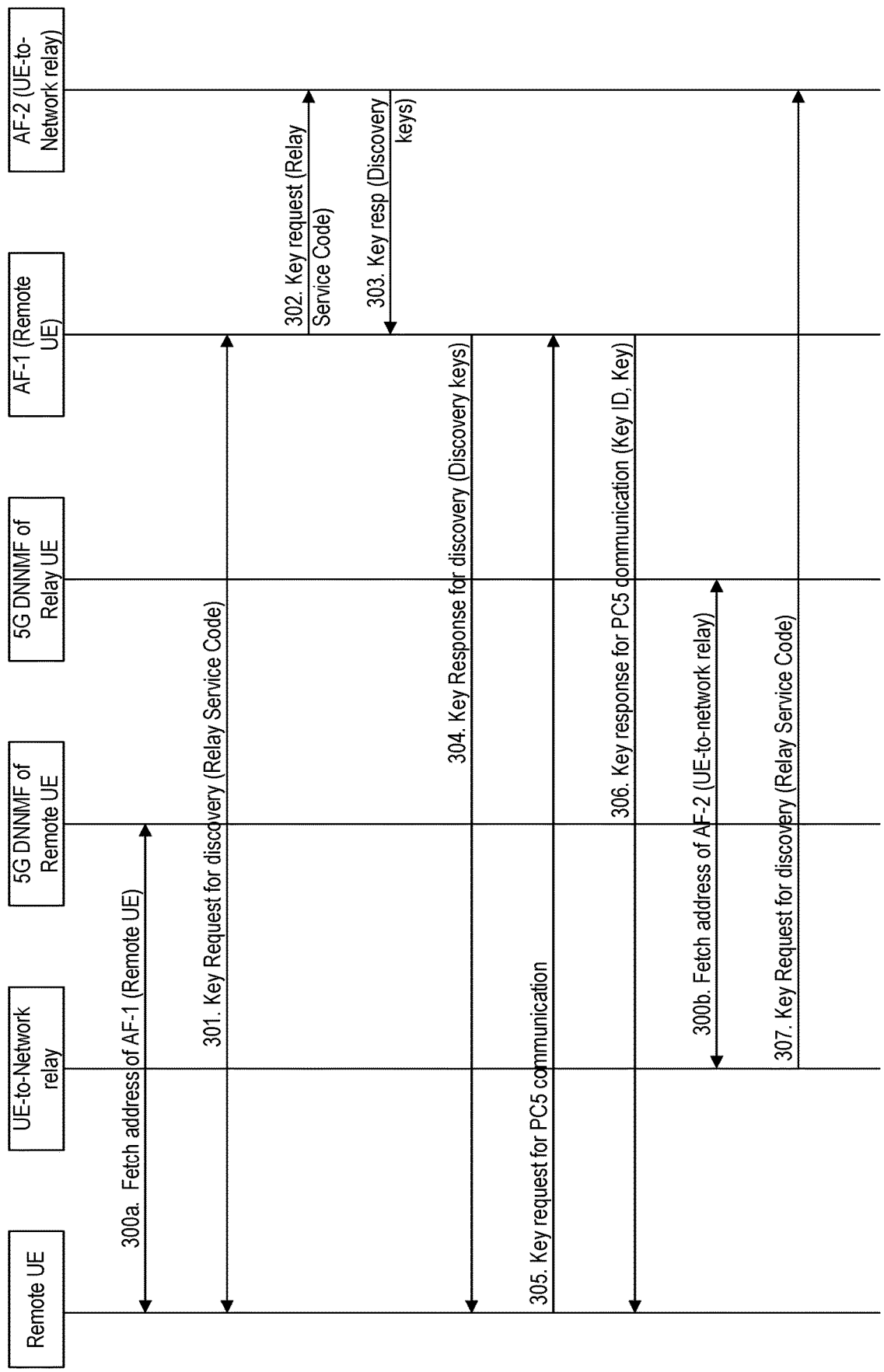
FIG. 3 is a message diagram illustrating handling of application functions for key management according to some embodiments of inventive concepts.
Figure 3B:
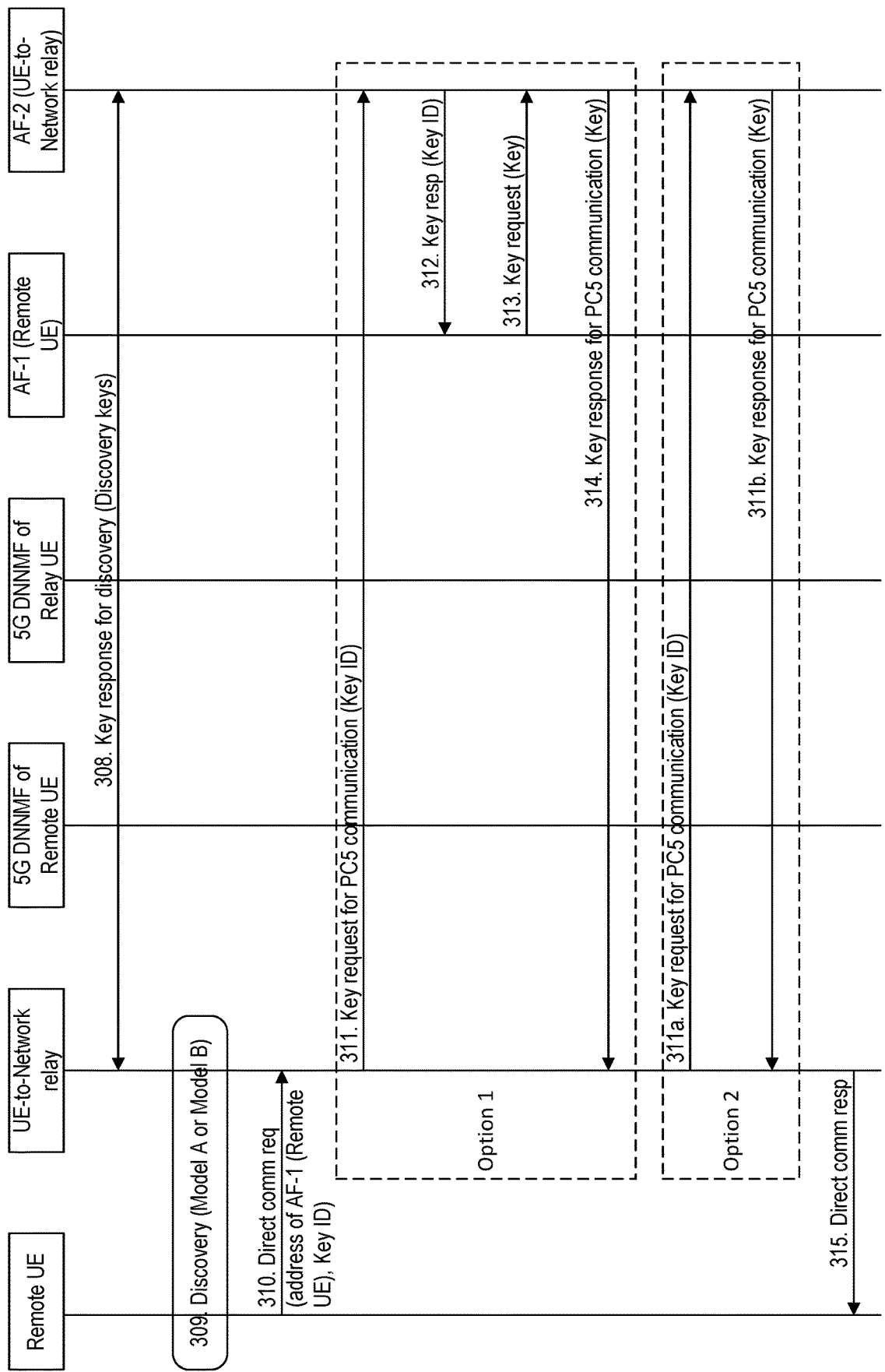

According to some embodiments of inventive concepts, the UE-to-network relay contacts the AF-1 (Remote UE) via the AF-2 (UE-to-network relay) (as described in Option 1 in FIG. 3A) or the UE-to-network relay contacts the AF-1 (Remote UE) directly (as described in Option 2 in FIG. 3B).

According to some embodiments of inventive concepts, the AF-1 (Remote UE) can communicate with the AF-2 (UE-to-network relay) to retrieve discovery keys for a specific Relay Service Code.

According to some embodiments of inventive concepts, an option could be that all AFs (e.g. AF-1 (Remote UE) and AF-2 (UE-to-network relay) and other AF(s)) can share the same algorithm to generate the discovery key for the same relay service code.

According to some embodiments of inventive concepts, the AF-2 (UE-to-network relay) can communicate with the AF-1 (Remote UE) to retrieve keys for PC5 communication.

According to some embodiments of inventive concepts, the Remote UE can provide the AF-1 (Remote UE) address to the UE-to-network relay on a PC5 interface.

According to some embodiments of inventive concepts, the Remote UE can include the address of the AF-1 (Remote UE) into the Remote UE information parameter defined in solution #6 in TR 23.752 [xx]. The AF-2 (UE-to-network relay)) can find out the address of the AF-1 (Remote UE) by looking into the Remote UE information parameter received on the PC5 interface from the Remote UE.

FIGS. 3A-B provide a message diagram illustrating handling of AF's for df management according to some embodiments of inventive concepts. Operations of FIGS. 3A-B are discussed below. While not explicitly shown in FIGS. 3A-B, each of Remote UE and UE-to-Network Relay may be provided as a communication devices according to the structure of FIG. 4. Accordingly, communications between Remote UE and UE-to-Network Relay may be provided over a wireless radio interface (through respective transceivers 401); communications between Remote UE and respective network nodes (e.g., 5G DNNFM of Remote UE and/or AF-1) may be provided over a wireless radio interface through transceiver 401 and a RAN node (not shown), and communications between UE-to-Network Relay and respective network nodes (e.g., 5G DNNFM of Relay UE, AF-1, and/or AF-2) may be provided over a wireless radio interface through transceiver 401 and a RAN node (not shown). Moreover, communications between respective network nodes (e.g., between AF-1 and AF-2) may be provided through respective network interfaces.

At operation 300a, the Remote UE (also referred to as a remote communication device) contacts the 5G DNNMF in its home PLMN to retrieve the address of the AF-1 (Remote UE) used for ProSe key management located in its home Public Land Mobile Network PLMN. Similarly, the UE-to-network Relay (also referred to as a relay UE or a relay communication device) contacts the 5G DNNMF in its home PLMN to retrieve the address of the AF-2 (UE-to-network Relay) used for ProSe key management located in its home PLMN. Operation 300a (for the Remote UE) may occur any time before the key request for discovery of operation 301, and operation 300b (of the UE-to-network Relay) may occur any time before the key request for discovery of operation 307.

As used herein, Application Function one AF-1 may be a key management server for a PLMN used by the Remote UE, and Application Function two AF-2 may be a key management server for a PLMN used by the UE-to-Network Relay. Moreover, the UE-to-Network Relay may be a UE providing a UE-to-Network Relay service associated with the relay service code.

At operation 301, the Remote UE uses the address of the AF-1 (Remote UE) and contacts the AF-1 (Remote UE) by initiating a Key Request message for discovery (also referred to as a Key Request for Discovery as shown in FIG. 3A) including the Relay Service Code. The Remote UE thus transmits the Key Request message for discovery to AF-1 based on the address of AF-1 from operation 300a.

At operation 302, the AF-1 (Remote UE) contacts the AF-2 (UE-to-network Relay) and forwards the Key Request message including the Relay Service Code (also referred to as a Key request as shown in FIG. 3A). AF-1 may determine an address for AF-2 according to and/or based on the Relay Service Code, e.g. a mapping between Relay Service Codes and the AF addresses (or FQDNs). Alternatively, AF-1 may obtain the address for AF-2 from the 5G DDNMF of the PLMN of AF-1.

An option could be that AF-1 (Remote UE) and AF-2 (UE-to-network relay) and other AF(s), can share the same algorithm to generate the discovery key for the same Relay Service Code. This would imply that the AF-1 (Remote UE) generates the discovery key from the Relay Service Code and does not need to contact the AF-2 (UE-to-network Relay) to obtain the discovery key. According to such an option, operations 302 and 303 may be omitted, and AF-1 can generate the discovery key based on the Relay Service Code.

At operation 303, the AF-2 (UE-to-network Relay) generates the discovery key for discovery of the UE-to-network Relay and provides it in the Key Response message (also referred to as a Key response as shown in FIG. 3A) that is transmitted to the AF-1 (Remote UE).

At operation 304, the AF-1 (Remote UE) forwards the Key Response message for discovery (shown in FIG. 3A as a Key response for discovery) including the discovery key to the UE.

At operation 305, the Remote UE contacts the AF-1 (Remote UE) by initiating a Key Request message for PC5 communication (shown as a Key request for PC5 communication) including the Relay Service Code. As used herein, a key request message for communication may include the key request message for PC5 communication.

At operation 306, the AF-1 (Remote UE) generates the Key for PC5 communication (shown as "Key" of operation 307) and provides it in the Key Response message for PC5 communication (shown as the Key response for PC5 communication of FIG. 3A) together with a Key ID, that is transmitted to the Remote UE. As used herein, the term Key for communication (also referred to as a communication Key) may be defined as including the Key for PC5 communication, a key for sidelink communication, etc. Accordingly, the Key Response message for PC5 communication includes the Key for PC5 communication and the Key Identifier ID for the Key for PC5 communication, and AF-1 transmits the Key Response message for PC5 communication to the Remote UE. As used herein, a key response message for communication may include the key response message for PC5 communication.

As discussed above with respect to operation 300b, the UE-to-network Relay contacts the 5G DNNMF in its home PLMN to retrieve the address of the AF-2 (UE-to-network Relay) used for ProSe key management located in its home PLMN.

At operation 307, the UE-to-network Relay contacts the AF-2 (UE-to-network Relay) by initiating a Key Request message for discovery (shown as a Key request for discovery in FIG. 3A) including the Relay Service Code that is transmitted to AF-2 based on the address of AF-2 from operation 300b. The AF-2 (UE-to-network Relay) generates itself the discovery key from the Relay Service Code.

At operation 308, the AF-2 (UE-to-network relay) provides the discovery key in the Key Response message for discovery (shown as the Key response for discovery in FIG. 3B) that is transmitted to the UE-to-network Relay.

At operation 309, the UE-to-network relay discovery may take place on the PC5 interface using either model A or model B discovery. Using either Model A or Model B discovery, the Remote UE may become aware of the UE-to-Network Relay based on an encrypted discovery message (e.g., the encrypted discovery announcement message of Model A, or encrypted discovery response message of Model B) received from the UE-to-Network Relay. More particularly, the UE-to-Network Relay may encrypt/transmit the encrypted discovery message based on the discovery key from operation 308, the Remote UE can receive/decrypt the encrypted discovery message using the discovery key from operation 304, and the discovery keys of operations 304 and 308 may be the same (since they are based on the same Relay Service Code).

Using Model A discovery, the UE-to-Network Relay may broadcast an encrypted discovery announcement message that is encrypted based on the discovery key of operation 308, and the Remote UE receive/decrypt the encrypted discovery announcement message using the discovery key of operation 304.

Using Model B discovery, the Remote UE may transmit an encrypted discovery request message that is encrypted based on the discovery key of operation 304, and the UE-to-Network Relay may receive/decrypt the encrypted discovery request message using the discovery key of operation 308. Responsive to receiving/decrypting the encrypted discovery request message, the UE-to-Network Relay may transmit an encrypted discovery response message (that is encrypted based on the discovery key of operation 308) to the Remote UE, and the Remote UE may receive/decrypt the encrypted discovery response message using the discovery key of Operation 304.

At operation 310, responsive to discovering the UE-to-Network Relay at operation 309, the Remote UE sends a Direct Communication Request (shown as Direct comm req in FIG. 3B) to the UE-to-Network Relay over the PC5 interface. The Remote UE includes the address of the AF-1 (Remote UE) and the Key ID (i.e., the Key ID for the PC5 Communication Key from operation 306) received from the AF-1 (Remote UE) together with the Relay Service Code. The Direct Communication Request may be transmitted/received without encryption, or the Direct Communication Request may be encrypted/decrypted using the discovery key of operations 304 and 308.

When the Remote UE discovers a UE-to-network relay in its vicinity, it sends the address (e.g. IP address or FQDN) of the AF-1 (Remote UE) explicitly on the PC5 interface to the UE-to-network relay.

Alternative, the UE-to-Network Relay (also referred to as a relay UE) can also use the remote UE information to query the AF-2 address from its 5G DDNMF.

There are two options/alternatives regarding how the UE-to-Network Relay can obtain the PC5 communication key to support relay communications between the remote UE and the network, and these options are discussed below with respect to Option 1 and Option 2 (which may be mutually exclusive alternatives/options).

Option 1 is discussed below with respect to operations 311, 312, 313, and 314 of FIG. 3B.

At operation 311, responsive to receiving the Direct communication request of operation 310, the UE-to-network Relay contacts the AF-2 (UE-to-network Relay) and includes the address of the AF-1 (Remote UE) in the Key Request message for PC5 communication (shown as Key request for PC5 communication in FIG. 3B) including the Key ID (from the Direct Communication Request of operation 310).

At operation 312, the AF-2 (UE-to-network Relay) contacts the AF-1 (Remote UE) and forwards the Key Request message (including the Key ID).

At operation 313, responsive to receiving the key request of operation 312, the AF-1 (Remote UE) includes the Key for PC5 communication identified by the Key ID in the Key Response message that is transmitted to the AF-2 (Remote UE).

At operation 314, the AF-2 (UE-to-network Relay) forwards the Key Response message for PC5 communication including the Key (shown as Key response for PC5 communication) to the UE-to-network Relay.

Option 2 is discussed below with respect to operations 311a and 311b of FIG. 3B.

At operation 311a, responsive to receiving the Direct communication request of operation 310, the UE-to-network Relay uses the address of the AF-1 (Remote UE) and contacts directly the AF-1 (Remote UE) by initiating a Key Request message for PC5 communication including the Key ID (shown as Key request for PC5 communication of FIG. 3B).

At operation 311b, responsive to receiving the Key Request message for PC5 communication of Operation 311a, the AF-1 (Remote UE) includes the Key for PC5 communication identified by Key ID in the Key Response message for PC5 communication (shown as Key response for PC5 communication) that is transmitted to the UE-to-network Relay.

After completion of operations 311, 312, 313, and 314 of Option 1 or after completion of operations 311a and 311b of Option 2, the UE-to-Network Relay and the Remote UE both have the Key for PC5 communication that can be used to encrypt/decrypt PC5 communications (also referred to as relay communications) between the Remote UE and the UE-to-Network Relay.

At operation 315, the UE-to-network Relay responds to the Remote with a Direct Communication Response on PC5. The UE-to-network Relay encrypts/transmits the Direct Communication response using the Key for PC5 communication, and the Remote UE receives/decrypts the Direct Communication Response using the Key for PC5 communication.

While not shown in FIGS. 3A-B, after the Direct Communication Response message is received at the Remote UE, uplink/downlink communications between the Remote UE and a Radio Access Network, RAN, node of the communication network may be relayed through the UE-to-Network Relay using the Key for PC5 communication to encrypt/decrypt communications between the Remote UE and the UE-to-Network Relay.

Regarding the discovery key, there can also be an option that there is one key server (or a plurality of key servers). For example, both AF-1 and AF-2 may ask the same key server for the discovery key associated with a specific Relay service code. Of course, the UEs can contact the server directly, but there may be more security if the key server can only be accessed by some Application Functions AFs. The key server(s) may be maintained by a third party (not a network operator) or some authority for ProSe commercial services. According to such options, when AF-1 receives the discovery key request from the remote UE, it contacts the key server to obtain the discovery key. When AF-2 receives the discovery key request from the relay UE, it contacts the key server to obtain the discovery key. If there are multiple such key servers, then the AFs may use the Relay Service Code to determine which key server to contact, e.g. using a mapping.

Operations of a remote communication device (shown as "Remote UE" in FIGS. 3A-B, and implemented using the communication device 400 structure of the block diagram of FIG. 4) will now be discussed with reference to the flow chart of FIG. 7 according to some embodiments of inventive concepts. For example, modules may be stored in memory 405 of FIG. 4, and these modules may provide instructions so that when the instructions of a module are executed by respective communication device processing circuitry 403, processing circuitry 403 performs respective operations of the flow chart.

At block 700, processing circuitry 403 obtains (through transceiver 401) an address of the Application Function node (AF-1) associated with the remote communication device. Operations of block 700 may be performed as discussed above with respect to Operation 300a of FIG. 3A. For example, the address may be obtained by fetching the address of the Application Function node (AF-1) associated with the remote communication device from a Direct Discovery Name Management Function (DDNMF) node associated with the remote communication device.

At block 701, processing circuitry 403 transmits (through transceiver 401) a key request message for discovery to an Application Function node (AF-1) associated with the remote communication device, wherein the key request message includes a relay service code. Operations of block 701 may be performed as discussed above with respect to Operation 301 of FIG. 3A. For example, the key request message for discovery may be transmitted to the Application Function node (AF-1) associated with the remote communication device based on the address of the Application Function node (AF-1) associated with the remote communication device obtained at block 700.

At block 704, processing circuitry 403 may receive (through transceiver 401) a discovery key. Operations of block 704 may be performed as discussed above with respect to operation 304 of FIG. 3A. For example, the discovery key may be received by receiving a key response message for discovery including the discovery key from the Application Function node (AF-1) associated with the remote communication device, wherein the key response message for discovery is associated with the key request message for discovery.

At block 705, processing circuitry 403 transmits (through transceiver 401) a key request message for communication to the Application Function node (AF-1) associated with the remote communication device, wherein the key request message for communication incudes the relay service code. Operations of block 705 may be performed as discussed above with respect to operation 305 of FIG. 3A. For example, the key request message for communication may be transmitted to the Application Function node (AF-1) associated with the remote communication device based on the address of the Application Function node (AF-1) associated with the remote communication device.

At block 706, processing circuitry 403 receives (through transceiver 401) a communication key and a key identifier ID for the communication key. Operations of block 705 may be performed as discussed above with respect to operation 306 of FIG. 3A. For example, receiving the communication key and the key ID for the communication key may include receiving a key response message for communication including the communication key and the key ID for the communication key, wherein the key response message for communication is associated with the key request message for communication.

At block 709, processing circuitry 403 discovers a relay communication device, wherein discovering the relay communication device includes receiving an encrypted discovery message from the relay communication device, and decrypting the encrypted discovery message using the discovery key. Operations of block 709 may be performed as discussed above with respect to operation 309 of FIG. 3B. For example, the encrypted discovery message may include an encrypted discovery announcement message that is broadcast by the relay communication device and received by processing circuitry 403 (through transceiver 401). In an alternative, discovering the relay communication device may include processing circuitry 403 transmitting (through transceiver 401) an encrypted discovery request message that is encrypted based on the discovery key, with the encrypted discovery message being an encrypted discovery response message corresponding to the encrypted discovery request message, and wherein the encrypted discovery response message is received by processing circuitry 403 (through transceiver 401) and decrypted using the discovery key.

At block 710, processing circuitry 403 transmits (through transceiver 401) a direct communication request to the relay communication device responsive to receiving and decrypting the encrypted discovery message from the relay communication device, wherein the direct communication request includes the key ID for the communication key. Operations of block 701 may be performed as discussed above with respect to operation 310 of FIG. 3B. For example, transmitting the direct communication request may include encrypting the direct communication request using the discovery key to provide an encrypted direct communication request, and transmitting (through transceiver 401) the encrypted direct communication request. In addition, the direct communication request may include the address of the Application Function node (AF-1) associated with the remote communication device, and/or the direct communication request may include the relay service code.

At block 715, processing circuitry 403 receives (through transceiver 401) an encrypted direct communication response from the relay communication device, wherein receiving the encrypted direct communication response includes decrypting the encrypted direct communication response. Operations of block 715 may be performed as discussed above with respect to operation 315 of FIG. 3B.

At block 717, processing circuitry 403 provides (through transceiver 401) providing communication with a Radio Access Network RAN node using the communication key, wherein the communication with the RAN node is relayed through the relay communication device. For example, providing the communication may include encrypting the communication using the communication key to provide an encrypted communication and transmitting the encrypted communication (through transceiver 401) to the relay communication device, and/or providing the communication may include receiving an encrypted communication (through transceiver 401) from the relay communication device and decrypting the encrypted communication using the communication key to provide the communication that is from the RAN node.

Figure 7:
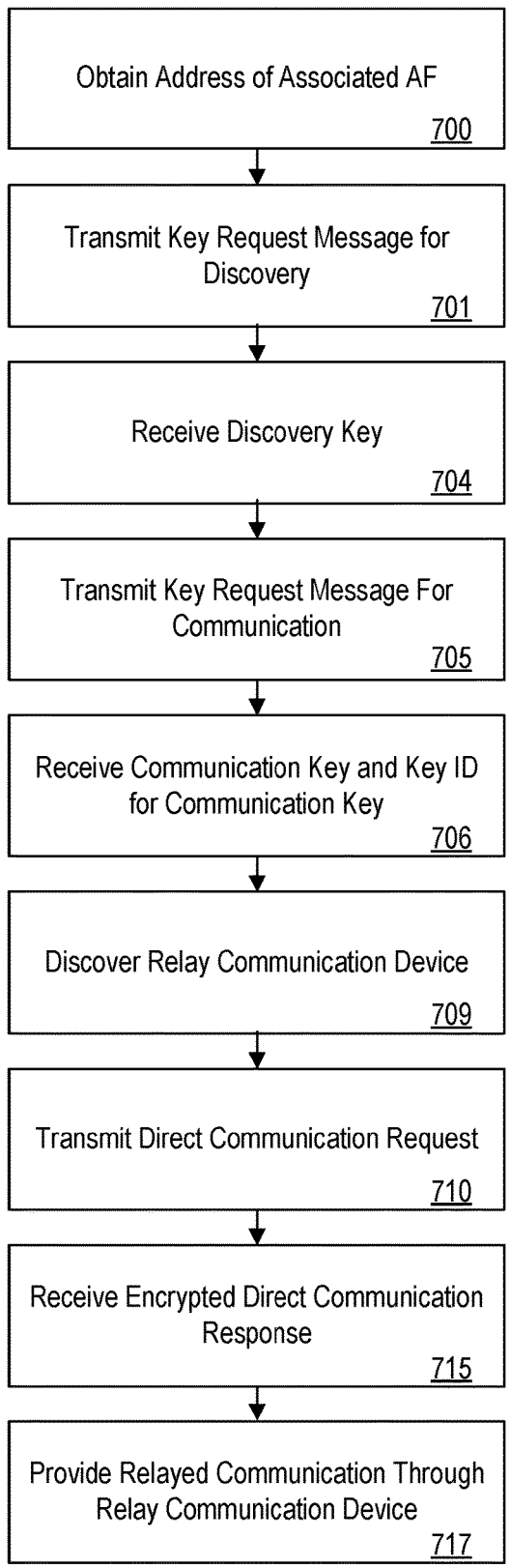
FIGS. 7-8 are flow charts illustrating operations of communication devices (e.g., a remote communication device and a relay communication device respectively) according to some embodiments of inventive concepts.

Various operations from the flow chart of FIG. 7 may be optional with respect to some embodiments of communication devices and related methods. Regarding methods of example embodiment 1 (set forth below), for example, operations of blocks 700, 701, 705, and/or 717 of FIG. 7 may be optional.

Operations of a relay communication device (shown as "UE-to-NW Relay" in FIGS. 3A-B, and implemented using the communication device 400 structure of the block diagram of FIG. 4) will now be discussed with reference to the flow chart of FIG. 8 according to some embodiments of inventive concepts. For example, modules may be stored in memory 405 of FIG. 4, and these modules may provide instructions so that when the instructions of a module are executed by respective communication device processing circuitry 403, processing circuitry 403 performs respective operations of the flow chart.

At block 800, processing circuitry 403 obtains (through transceiver 401) an address of the Application Function node (AF-2) associated with the relay communication device. Operations of block 800 may be performed as discussed above with respect to operation 300b of FIG. 3A. For example, obtaining the address may include fetching the address of the Application Function node (AF-2) associated with the relay communication device from a Direct Discovery Name Management Function DDNMF node associated with the relay communication device.

At block 807, processing circuitry 403 transmits (through transceiver 401) a key request message for discovery to an Application Function node (AF-2) associated with the relay communication device, wherein the key request message includes a relay service code. Operations of block 807 may be performed as discussed above with respect to operation 307 of FIG. 3A. For example, the key request message for discovery may be transmitted to the Application Function node (AF-2) associated with the relay communication device based on the address of the Application Function node (AF-2) associated with the relay communication device.

At block 808, processing circuitry 403 receives (through transceiver 401) a discovery key. Operations of block 808 may be performed as discussed above with respect to operation 308 of FIG. 3B. For example, receiving the discovery key may include receiving a key response message for discovery including the discovery key from the Application Function node (AF-2) associated with the relay communication device, wherein the key response message for discovery is associated with the key request message for discovery.

At block 809, processing circuitry 403 transmits (through transceiver 401) an encrypted discovery message, wherein the encrypted discovery message is encrypted using the discovery key. Operations of block 809 may be performed as discussed above with respect to operation 309 of FIG. 3B. For example, the encrypted discovery message may be an encrypted discovery announcement message that is broadcast (by processing circuitry 403 through transceiver 401) by the relay communication device. In an alternative, processing circuitry 403 may receiving (through transceiver 401) an encrypted discovery request message, wherein receiving the encrypted discovery request message includes decrypting the encrypted discovery request message using the discovery key; and the encrypted discovery message may be an encrypted discovery response message that is transmitted (by processing circuitry 403 through transceiver 401) responsive to the encrypted discovery request message, wherein the encrypted discovery response message is encrypted using the discovery key.

At block 810, processing circuitry 403 receives (through transceiver 401) a direct communication request from a remote communication device, wherein the direct communication request includes a key ID. Operations of block 810 may be performed as discussed above with respect to operation 310 of FIG. 3B. For example, receiving the direct communication request may include processing circuitry 403 receiving (through transceiver 401) an encrypted direct communication request and decrypting the encrypted direct communication request using the discovery key to provide the direct communication request. Moreover, the direct communication request may include the relay service code, and/or the direct communication request may include an address of an Application Function node (AF-1) associated with the remote communication device.

At block 811, processing circuitry 403 may obtain (through transceiver 401) a communication key corresponding to the key ID from the direct communication request. Operations of block 811 may be performed at discussed above with respect to operations 311 and 314 of FIG. 3B or with respect to operations 311a and 311b of FIG. 3B. In an alternative corresponding to operations 311 and 314 of FIG. 3B (shown as Option 1), processing circuitry 403 may transmit (through transceiver 401) a key request message for communication to the Application Function node (AF-2) associated with the relay communication device in response to receiving the direct communication message, wherein the key request message for communication incudes the key ID and the address of the Application Function node (AF-1) associated with the remote communication device; and processing circuitry 403 may receive (through transceiver 401) a key response message for communication from the Application Function node (AF-2) associated with the relay communication device, wherein the key response message includes the communication key corresponding to the key ID. In an alternative corresponding to operations 311a and 311b of FIG. 3B (shown as Option 2), processing circuitry 403 may transmit (through transceiver 401) a key request message for communication to the Application Function node (AF-1) associated with the remote communication device using the address of the Application Function node (AF-1) associated with the remote communication device in response to receiving the direct communication message, wherein the key request message for communication incudes the key ID; and processing circuitry 403 may receive (through transceiver 401) a key response message for communication from the Application Function node (AF-1) associated with the remote communication device, wherein the key response message includes the communication key corresponding to the key ID.

At block 815, processing circuitry 403 transmits (through transceiver 401) an encrypted direct communication response to the remote communication device, wherein the encrypted direct communication response is encrypted using the communication key corresponding to the key ID. Operations of block 815 may be performed as discussed above with respect to operation 315 of FIG. 3B.

At block 817, processing circuitry 403 relays (through transceiver 401) communication between the remote communication device and a Radio Access Network RAN node using the communication key for encryption between the remote communication device and the relay communication device. For example, relaying the communication may include receiving the communication as an encrypted communication from the remote communication device, decrypting the encrypted communication using the communication key, and transmitting the communication to the RAN node; and/or relaying the communication may include receiving the communication from the RAN node, encrypting the communication using the communication key to provide an encrypted communication, and transmitting the encrypted communication to the remote communication device.

Figure 8:
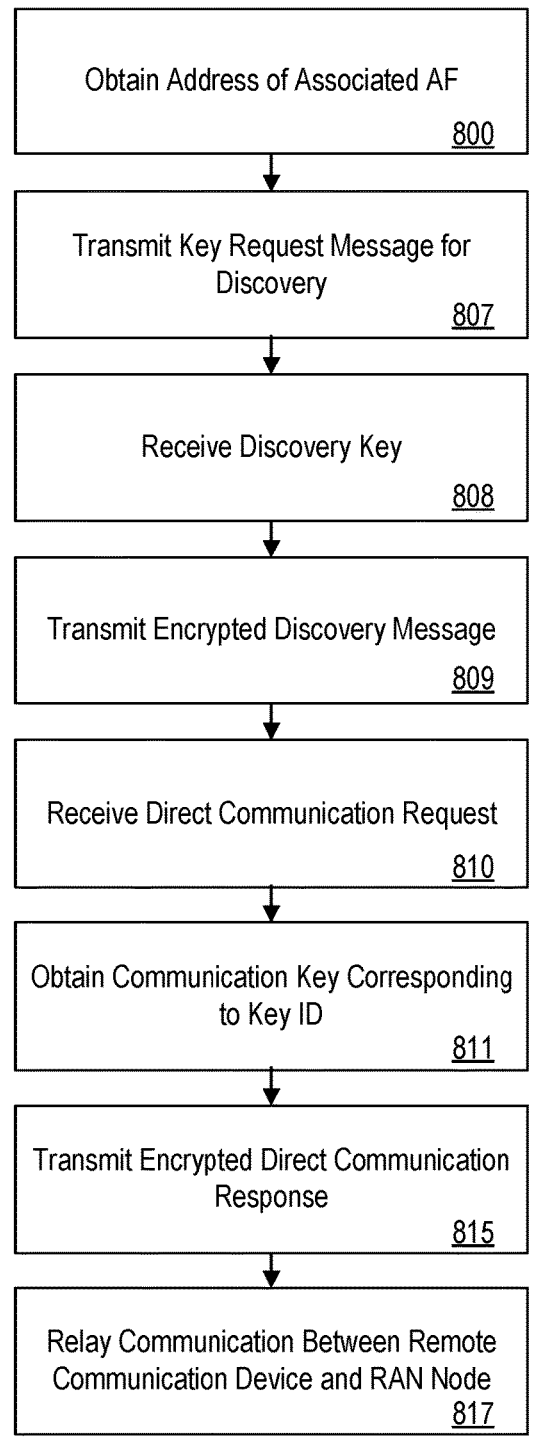

Various operations from the flow chart of FIG. 8 may be optional with respect to some embodiments of communication devices and related methods. Regarding methods of example embodiment 13 (set forth below), for example, operations of blocks 800, 807, and/or 817 of FIG. 8 may be optional.

Operations of an Application Function node (shown as "AF-1 (Remote UE)" in FIGS. 3A-B, and implemented using the Core Network CN node 600 structure of the block diagram of FIG. 6) will now be discussed with reference to the flow chart of FIG. 9 according to some embodiments of inventive concepts. For example, modules may be stored in memory 605 of FIG. 6, and these modules may provide instructions so that when the instructions of a module are executed by respective CN node processing circuitry 603, processing circuitry 603 performs respective operations of the flow chart.

At block 901, processing circuitry 603 receives (through network interface 607) a key request message for discovery from the remote communication device, wherein the key request message includes a relay service code. Operations of block 901 may be performed as discussed above with respect to operation 301 of FIG. 3A.

At block 902, processing circuitry 603 obtains a discovery key based on the relay service code included in the key request message for discovery. For example, processing circuitry 603 may obtain the discovery key by deriving the discovery key internally based on the relay service code. In an alternative, processing circuitry 603 may obtain the discovery key by: transmitting (operation 302) a key request message (through network interface 607) to an Application Function node (AF-2) associated with a relay communication device responsive to receiving the key request message for discovery where the key request message includes the relay service code (e.g., as discussed above with respect to operation 302 of FIG. 3A); and receiving (operation 303) a key response message (through network interface 607) from the Application Function node (AF-2) associated with the relay communication device where the key response message includes the discovery key (e.g., as discussed above with respect to operation 303 of FIG. 3A). In alternatives corresponding to operations 302 and 303 of FIG. 3A, transmitting the key request message of operation 302 of FIG. 3A may include forwarding the key request message for discovery of operation 301 of FIG. 3A.

At block 904, processing circuitry 603 transmits (through network interface 607) a key response message for discovery including the discovery key to the remote communication device. Operations of block 904 may be performed as discussed above with respect to operation 304 of FIG. 3A. In alternatives corresponding to operations 302 and 303 of FIG. 3A, transmitting the key response message for discovery of operation 304 may include forwarding the key response message of operation 303 of FIG. 3A.

At block 905a, processing circuitry 603 receives (through network interface 607) a key request message for communication from the remote communication device, wherein the key request message for communication incudes the relay service code. Operations of block 905 may be performed as discussed above with respect to operation 305 of FIG. 3A.

At block 905b, processing circuitry 603 obtains a communication key and a key ID for the communication key based on the relay service code.

At block 906, processing circuitry 603 transmits a key response message for communication to the remote communication device, wherein the key response message includes the communication key and the key ID for the communication key. Operations of block 906 may be performed as discussed above with respect to operation 306 of FIG. 3A.

At block 912, processing circuitry 603 receives (through network interface 607) a key request message including the key ID.

At block 913, processing circuitry 603 transmits (through network interface 607) a key response message including the communication key responsive to receiving the key request message including the key ID.

For example, operations of blocks 912 and 913 may be performed as discussed above with respect to operations 312 and 313 of FIG. 3B (shown as option 1). In such embodiments: at block 912, processing circuitry 603 receives (through network interface 607) the key request message including the key ID from an Application Function node (AF-2) associated with a relay communication device (as discussed above with respect to operation 312 of FIG. 3B); and at block 913, processing circuitry 603 transmits (through network interface 607) the key response message including the communication key to the Application Function node (AF-2) associated with a relay communication device responsive to receiving the key request message including the key ID (as discussed above with respect to operation 313 of FIG. 3B).

In additional or alternative embodiments, operations of block 912 and 913 may be performed as discussed above with respect to operations 311a and 311b of FIG. 3B (shown as option 2). In such embodiments: at block 912, processing circuitry 603 receives (through network interface 607) the key request message including the key ID from a relay communication device (as discussed above with respect to operation 311a of FIG. 3B); and at block 913, processing circuitry 603 transmits (through network interface 607) the key response message including the communication key to the relay communication device responsive to receiving the key request message including the key ID (as discussed above with respect to operation 311b of FIG. 3B).

Figure 9:
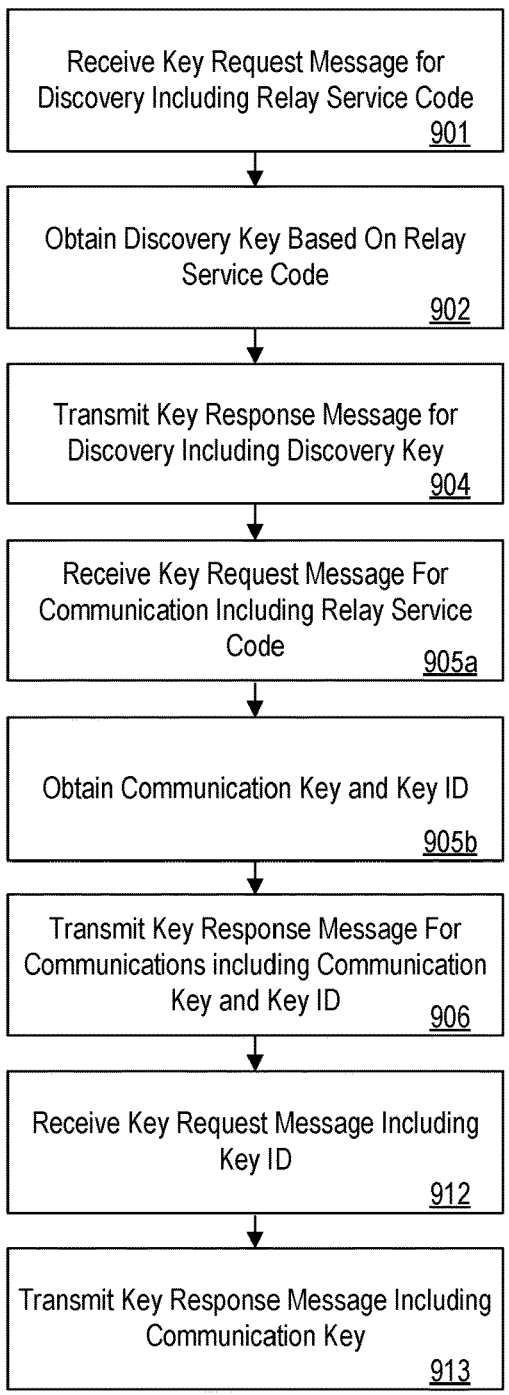
FIGS. 9-10 are flow charts illustrating operations of application functions according to some embodiments of inventive concepts.

Various operations from the flow chart of FIG. 9 may be optional with respect to some embodiments of CN nodes and related methods. Regarding methods of example embodiment 27 (set forth below), for example, operations of blocks 905a, 905b, 906, 912, and/or 913 of FIG. 9 may be optional.

Operations of an Application Function node (shown as "AF-2 (UE-to-network relay)" in FIGS. 3A-B, and implemented using the Core Network CN node 600 structure of the block diagram of FIG. 6) will now be discussed with reference to the flow chart of FIG. 10 according to some embodiments of inventive concepts. For example, modules may be stored in memory 605 of FIG. 6, and these modules may provide instructions so that when the instructions of a module are executed by respective CN node processing circuitry 603, processing circuitry 603 performs respective operations of the flow chart.

At block 1002a, processing circuitry 603 receives (through network interface 607) a key request message from an Application Function node (AF-1) associated with the remote communication device, wherein the key request message includes a relay service code. Operations of block 1002a may be performed as discussed above with respect to operation 302 of FIG. 3A.

At block 1002b, processing circuitry 603 obtains a discovery key based on the relay service code included in the key request message from the Application Function node (AF-1) associated with the remote communication device.

At block 1003, processing circuitry 603 transmits (through network interface 607) a key response message including the discovery key (obtained at block 1002b) to the Application Function node (AF-1) associated with the remote communication device. Operations of block 1003 may be performed as discussed above with respect to operation 303 of FIG. 3A.

At block 1007a, processing circuitry 603 receives (through network interface 607) a key request message for discovery from the relay communication device, wherein the key request message includes the relay service code. Operations of block 1007 may be performed as discussed above with respect to operation 307 of FIG. 3A.

At block 1007b, processing circuitry 603 obtains a discovery key based on the relay service code included in the key request message for discovery.

At block 1008, processing circuitry transmits (through network interface 607) a key response message for discovery including the discovery key to the relay communication device. Operations of block 1008 may be performed as discussed above with respect to operation 308 of FIG. 3B. For example, processing circuitry 603 may obtain the discovery key by deriving the discovery key internally based on the relay service code.

At block 1011, processing circuitry 603 receives (through network interface 607) a key request message for communication from the relay communication device, wherein the key request message for communication incudes a key ID. Operations of block 1011 may be performed as discussed above with respect to operation 311 of FIG. 3B.

At block 1012, processing circuitry 603 transmits (through network interface 607) a key request message including the key ID to an Application Function (AF-1) associated with a remote communication device. Operations of block 1012 may be performed as discussed above with respect to operation 312 of FIG. 3B. For example, transmitting the key request message may include forwarding the key request message for communication (received at block 1011).

At block 1013, processing circuitry 603 receives (through network interface 607) a key response message (from AF-1) including a communication key corresponding to the key ID, wherein the key response message corresponds to the key request message. Operations of block 1013 may be performed as discussed above with respect to operation 313 of FIG. 3B.

At block 1014, processing circuity 603 transmits (through network interface 607) a key response message for communication including the communication key to the relay communication node responsive to receiving the key response message. Operations of block 1014 may be performed as discussed above with respect to operation 314 of FIG. 3B. For example, transmitting the key response message for communication may include forwarding the key response message (received at block 1013).

Figure 10:
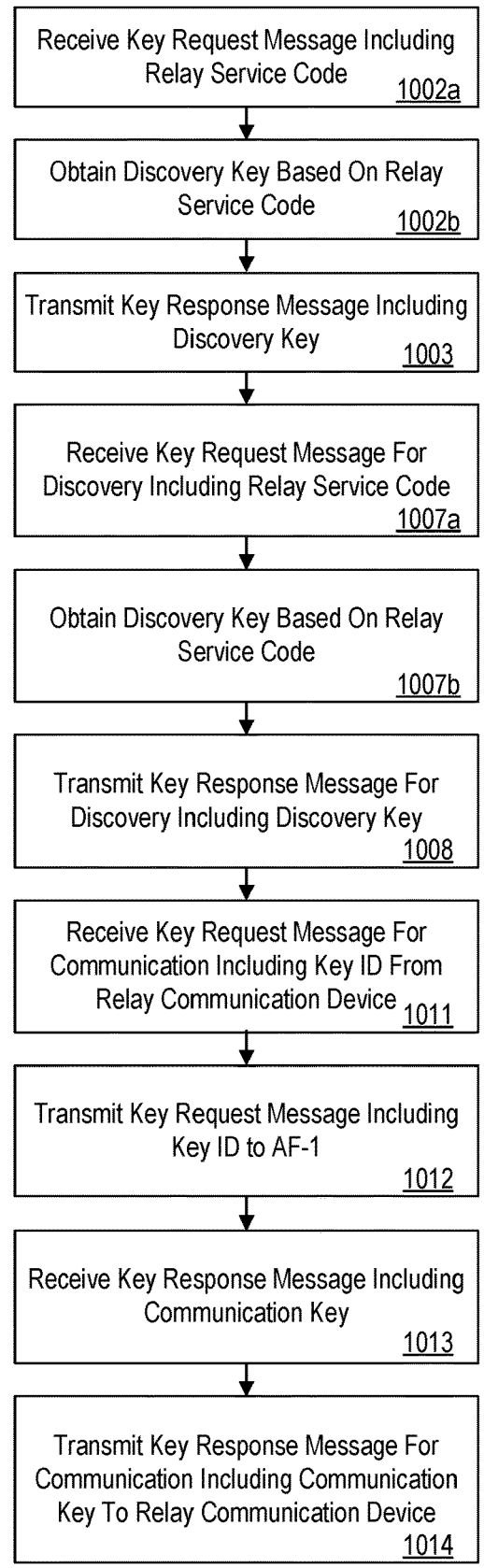

Various operations from the flow chart of FIG. 10 may be optional with respect to some embodiments of CN nodes and related methods. Regarding methods of example embodiment 33 (set forth below), for example, operations of blocks 1007a, 1007b, 1008, 1011, 1012, 1013, and/or 1014 of FIG. 10 may be optional.

Example embodiments are discussed below.

Embodiment 1. A method of operating a remote communication device, the method comprising:
  receiving (704) a discovery key;
  receiving (706) a communication key and a key identifier, ID, for the communication key;
  discovering (709) a relay communication device, wherein discovering the relay communication device includes receiving an encrypted discovery message from the relay communication device, and decrypting the encrypted discovery message using the discovery key;

transmitting (710) a direct communication request to the relay communication device responsive to receiving and decrypting the encrypted discovery message from the relay communication device, wherein the direct communication request includes the key ID for the communication key; and receiving (715) an encrypted direct communication response from the relay communication device, wherein receiving the encrypted direct communication response includes decrypting the encrypted direct communication response.

2. The method of Embodiment 1, wherein transmitting the direct communication request comprises encrypting the direct communication request using the discovery key to provide an encrypted direct communication request, and transmitting the encrypted direct communication request.

3. The method of any of Embodiments 1-2 further comprising:

transmitting (701) a key request message for discovery to an Application Function node (AF-1) associated with the remote communication device, wherein the key request message includes a relay service code; and transmitting (705) a key request message for communication to the Application Function node (AF-1) associated with the remote communication device, wherein the key request message for communication incudes the relay service code;

wherein receiving the discovery key comprises receiving a key response message for discovery including the discovery key from the Application Function node (AF-1) associated with the remote communication device, and wherein the key response message for discovery is associated with the key request message for discovery;

wherein receiving the communication key and the key ID for the communication key comprises receiving a key response message for communication including the communication key and the key ID for the communication key, and wherein the key response message for communication is associated with the key request message for communication.

4. The method of Embodiment 3 further comprising:

obtaining (700) an address of the Application Function node (AF-1) associated with the remote communication device;

wherein the key request message for discovery is transmitted to the Application Function node (AF-1) associated with the remote communication device based on the address of the Application Function node (AF-1) associated with the remote communication device;

wherein the key request message for communication is transmitted to the Application Function node (AF-1) associated with the remote communication device based on the address of the Application Function node (AF-1) associated with the remote communication device.

5. The method of Embodiment 4, wherein obtaining the address comprises fetching the address of the Application Function node (AF-1) associated with the remote communication device from a Direct Discovery Name Management Function, DDNMF, node associated with the remote communication device.

6. The method any of Embodiments 4-5, wherein the direct communication request includes the address of the Application Function node (AF-1) associated with the remote communication device.

7. The method of any of Embodiments 3-6, wherein the direct communication request includes the relay service code.

8. The method of any of Embodiments 1-7, wherein the encrypted discovery message comprises an encrypted discovery announcement message that is broadcast by the relay communication device.

9. The method of any of Embodiments 1-7, wherein discovering the relay communication device comprises transmitting an encrypted discovery request message that is encrypted based on the discovery key, and wherein the encrypted discovery message comprises an encrypted discovery response message corresponding to the encrypted discovery request message, and wherein the encrypted discovery response message is decrypted using the discovery key.

10. The method of any of Embodiments 1-9 further comprising:

providing (717) communication with a Radio Access Network, RAN, node using the communication key, wherein the communication with the RAN node is relayed through the relay communication device.

11. The method of Embodiment 10, wherein providing the communication comprises encrypting the communication using the communication key to provide an encrypted communication, and transmitting the encrypted communication to the relay communication device.

12. The method of Embodiment 10, wherein providing the communication comprises receiving an encrypted communication from the relay communication device, and decrypting the encrypted communication using the communication key to provide the communication that is from the RAN node.

13. A method of operating a relay communication device, the method comprising:

receiving (808) a discovery key;

transmitting (809) an encrypted discovery message, wherein the encrypted discovery message is encrypted using the discovery key;

receiving (810) a direct communication request from a remote communication device, wherein the direct communication request includes a key ID;

obtaining (811) a communication key corresponding to the key ID from the direct communication request; and transmitting (815) an encrypted direct communication response to the remote communication device, wherein the encrypted direct communication response is encrypted using the communication key corresponding to the key ID.

14. The method of Embodiment 13, wherein receiving the direct communication request comprises receiving an encrypted direct communication request and decrypting the encrypted direct communication request using the discovery key to provide the direct communication request.

15. The method of any of Embodiments 13-14 further comprising:

transmitting (807) a key request message for discovery to an Application Function node (AF-2) associated with the relay communication device, wherein the key request message includes a relay service code; and wherein receiving the discovery key comprises receiving a key response message for discovery including the discovery key from the Application Function node (AF-2) associated with the relay communication device, and wherein the key response message for discovery is associated with the key request message for discovery.

16. The method of Embodiment 15 further comprising:
obtaining (800) an address of the Application Function node (AF-2) associated with the relay communication device;
wherein the key request message for discovery is transmitted to the Application Function node (AF-2) associated with the relay communication device based on the address of the Application Function node (AF-2) associated with the relay communication device.

17. The method of Embodiment 16, wherein obtaining the address comprises fetching the address of the Application Function node (AF-2) associated with the relay communication device from a Direct Discovery Name Management Function, DDNMF, node associated with the relay communication device.

18. The method of any of Embodiments 15-17, wherein the direct communication request includes the relay service code.

19. The method any of Embodiments 15-18, wherein the direct communication request includes an address of an Application Function node (AF-1) associated with the remote communication device.

20. The method of Embodiment 19, wherein obtaining the communication key comprises,
transmitting a key request message for communication to the Application Function node (AF-2) associated with the relay communication device in response to receiving the direct communication message, wherein the key request message for communication incudes the key ID and the address of the Application Function node (AF-1) associated with the remote communication device, and
receiving a key response message for communication from the Application Function node (AF-2) associated with the relay communication device, wherein the key response message includes the communication key corresponding to the key ID.

21. The method of Embodiment 19, wherein obtaining the communication key comprises,
transmitting a key request message for communication to the Application Function node (AF-1) associated with the remote communication device using the address of the Application Function node (AF-1) associated with the remote communication device in response to receiving the direct communication message, wherein the key request message for communication incudes the key ID, and
receiving a key response message for communication from the Application Function node (AF-1) associated with the remote communication device, wherein the key response message includes the communication key corresponding to the key ID.

22. The method of any of Embodiments 13-21, wherein the encrypted discovery message comprises an encrypted discovery announcement message that is broadcast by the relay communication device.

23. The method of any of Embodiments 13-21 further comprising:
receiving an encrypted discovery request message, wherein receiving the encrypted discovery request message includes decrypting the encrypted discovery request message using discovery key, and
wherein the encrypted discovery message comprises an encrypted discovery response message that is transmitted responsive to the encrypted discovery request message, and wherein the encrypted discovery response message is encrypted using the discovery key.

24. The method of any of Embodiments 13-23 further comprising:
relaying (817) communication between the remote communication device and a Radio Access Network, RAN, node using the communication key for encryption between the remote communication device and the relay communication device.

25. The method of Embodiment 24, wherein relaying the communication comprises receiving the communication as an encrypted communication from the remote communication device, decrypting the encrypted communication using the communication key, and transmitting the communication to the RAN node.

26. The method of Embodiment 24, wherein relaying the communication comprises receiving the communication from the RAN node, encrypting the communication using the communication key to provide an encrypted communication, and transmitting the encrypted communication to the remote communication device.

27. A method of operating an Application Function node (AF-1) associated with a remote communication device, the method comprising:
receiving (901) a key request message for discovery from the remote communication device, wherein the key request message includes a relay service code;
obtaining (902) a discovery key based on the relay service code included in the key request message for discovery; and
transmitting (904) a key response message for discovery including the discovery key to the remote communication device.

28. The method of Embodiment 27, wherein obtaining the discovery key comprises deriving the discovery key internally based on the relay service code.

29. The method of Embodiment 27, wherein obtaining (902) the discovery key comprises,
transmitting a key request message to an Application Function node (AF-2) associated with a relay communication device responsive to receiving the key request message for discovery, wherein the key request message includes the relay service code, and
receiving a key response message from the Application Function node (AF-2) associated with the relay communication device, wherein the key response message includes the discovery key.

30. The method of Embodiment 29, wherein transmitting the key request message comprises forwarding the key request message for discovery, and wherein transmitting the key response message for discovery comprises forwarding the key response message.

31. The method of any of Embodiments 27-30, further comprising: receiving (905a) a key request message for communication from the remote communication device, wherein the key request message for communication incudes the relay service code;
obtaining (905b) a communication key and a key ID for the communication key based on the relay service code; and
transmitting (906) a key response message for communication to the remote communication device, wherein the key response message includes the communication key and the key ID for the communication key.

32. The method of Embodiment 31 further comprising:
receiving (912) a key request message, wherein the key request message includes the key ID; and
transmitting (913) a key response message including the communication key responsive to receiving the key request message including the key ID.

33. A method of operating an Application Function node (AF-2) associated with a relay communication device, the method comprising:
receiving (1007a) a key request message for discovery from the relay communication device, wherein the key request message includes a relay service code;
obtaining (1007b) a discovery key based on the relay service code included in the key request message for discovery; and
transmitting (1008) a key response message for discovery including the discovery key to the relay communication device.

34. The method of Embodiment 33, wherein obtaining the discovery key comprises deriving the discovery key internally based on the relay service code.

35. The method of any of Embodiments 33-34, further comprising:
receiving (1011) a key request message for communication from the relay communication device, wherein the key request message for communication incudes a key ID;
transmitting (1012) a key request message including the key ID to an Application Function (AF-1) associated with a remote communication device;
receiving (1013) a key response message including a communication key corresponding to the key ID, wherein the key response message corresponds to the key request message; and
transmitting (1014) a key response message for communication including the communication key to the relay communication node responsive to receiving the key response message.

36. The method of Embodiment 35, wherein transmitting the key request message comprises forwarding the key request message for communication, and wherein transmitting the key response message for communication comprises forwarding the key response message.

37. The method of any of Embodiments 35-36 further comprising:
receiving (1002a) a key request message from an Application Function node (AF-1) associated with the remote communication device, wherein the key request message includes the relay service code;
obtaining (1002b) the discovery key based on the relay service code included in the key request message from the Application Function node (AF-1) associated with the remote communication device; and
transmitting (1003) a key response message including the discovery key to the Application Function node (AF-1) associated with the remote communication device.

38. A remote communication device (400) comprising:
processing circuitry (403); and
memory (405) coupled with the processing circuitry, wherein the memory includes instructions that when executed by the processing circuitry causes the remote communication device to perform operations according to any of Embodiments 1-12.

39. A remote communication device (400) adapted to perform according to any of Embodiments 1-12.

40. A computer program comprising program code to be executed by processing circuitry (403) of a remote communication device (400), whereby execution of the program code causes the remote communication device (400) to perform operations according to any of embodiments 1-12.

41. A computer program product comprising a non-transitory storage medium including program code to be executed by processing circuitry (403) of a remote communication device (400), whereby execution of the program code causes the remote communication device (400) to perform operations according to any of embodiments 1-12.

42. A relay communication device (400) comprising:
processing circuitry (403); and
memory (405) coupled with the processing circuitry, wherein the memory includes instructions that when executed by the processing circuitry causes the relay communication device to perform operations according to any of Embodiments 13-26.

43. A relay communication device (400) adapted to perform according to any of Embodiments 13-26.

44. A computer program comprising program code to be executed by processing circuitry (403) of a relay communication device (400), whereby execution of the program code causes the relay communication device (400) to perform operations according to any of embodiments 13-26.

45. A computer program product comprising a non-transitory storage medium including program code to be executed by processing circuitry (403) of a relay communication device (400), whereby execution of the program code causes the relay communication device (400) to perform operations according to any of embodiments 13-26.

46. An application function, AF, node (600, AF-1) comprising:
processing circuitry (603); and
memory (605) coupled with the processing circuitry, wherein the memory includes instructions that when executed by the processing circuitry causes the AF node to perform operations according to any of Embodiments 27-32.

47. An application function, AF, node (600, AF-1) adapted to perform according to any of Embodiments 27-32.

48. A computer program comprising program code to be executed by processing circuitry (403) of an application function, AF, node (600, AF-1), whereby execution of the program code causes the AF node (600, AF-1) to perform operations according to any of embodiments 27-32.

49. A computer program product comprising a non-transitory storage medium including program code to be executed by processing circuitry (603) of an application function, AF, node (600, AF-1), whereby execution of the program code causes the AF node (600, AF-1) to perform operations according to any of embodiments 27-32.

50. An application function, AF, node (600, AF-2) comprising:
processing circuitry (603); and
memory (605) coupled with the processing circuitry, wherein the memory includes instructions that when executed by the processing circuitry causes the AF node to perform operations according to any of Embodiments 33-37.

51. An application function, AF, node (600, AF-2) adapted to perform according to any of Embodiments 33-37.

52. A computer program comprising program code to be executed by processing circuitry (603) of an application function, AF, node (600, AF-2), whereby execution of the program code causes the AF node (600, AF-2) to perform operations according to any of embodiments 33-37.

53. A computer program product comprising a non-transitory storage medium including program code to be executed by processing circuitry (603) of an application function, AF, node (600, AF-2), whereby execution of the program code causes the AF node (600, AF-2) to perform operations according to any of embodiments 33-37.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a remote communication device, the method comprising:
fetching an address of an Application Function node (AF-1) associated with the remote communication device from a Direct Discovery Name Management Function, DDNMF, node associated with the remote communication device;
transmitting a key request message for discovery to the Application Function node (AF-1) associated with the remote communication device based on the address of the Application Function node (AF-1) associated with the remote communication device, the key request message for discovery including a relay service code;
receiving a key response message for discovery including a discovery key from the Application Function node (AF-1) associated with the remote communication device, the key response message for discovery being associated with the key request message for discovery;
transmitting a key request message for communication to the Application Function node (AF-1) associated with the remote communication device based on the address of the Application Function node (AF-1) associated with the remote communication device, the key request message for communication including the relay service code;
receiving a key response message for communication including a communication key and a key identifier, ID, for the communication key, the key response message for communication being associated with the key request message for communication;
discovering a relay communication device, wherein discovering the relay communication device includes receiving an encrypted discovery message from the relay communication device and decrypting the encrypted discovery message using the discovery key;
transmitting a direct communication request to the relay communication device responsive to receiving and decrypting the encrypted discovery message from the relay communication device, wherein the direct communication request includes the key ID for the communication key; and
receiving an encrypted direct communication response from the relay communication device, wherein receiving the encrypted direct communication response includes decrypting the encrypted direct communication response.

2. The method of claim 1, wherein transmitting the direct communication request comprises:
encrypting the direct communication request using the discovery key to provide an encrypted direct communication request; and
transmitting the encrypted direct communication request.

3. The method of claim 1, wherein the direct communication request includes the address of the Application Function node (AF-1) associated with the remote communication device.

4. The method of claim 1, wherein the direct communication request includes the relay service code.

5. The method of claim 1, wherein the AF-1 comprises a proximity service key management function, PKMF.

6. The method of claim 1, wherein the encrypted discovery message comprises an encrypted discovery announcement message that is broadcast by the relay communication device.

7. The method of claim 1, wherein discovering the relay communication device comprises transmitting an encrypted discovery request message that is encrypted based on the discovery key, the encrypted discovery message comprising an encrypted discovery response message corresponding to the encrypted discovery request message and the encrypted discovery response message being decrypted using the discovery key.

8. The method of claim 1 further comprising providing communication with a Radio Access Network, RAN, node using the communication key, the communication with the RAN node being relayed through the relay communication device.

9. The method of claim 8, wherein providing the communication comprises:
encrypting the communication using the communication key to provide an encrypted communication; and
transmitting the encrypted communication to the relay communication device.

10. The method of claim 8, wherein providing the communication comprises:
receiving an encrypted communication from the relay communication device; and
decrypting the encrypted communication using the communication key to provide the communication that is from the RAN node.

11. A method of operating a relay communication device, the method comprising:
fetching an address of an Application Function node (AF-2) associated with the relay communication device from a Direct Discovery Name Management Function, DDNMF, node associated with the relay communication device;
transmitting a key request message for discovery to the Application Function node (AF-2) associated with the relay communication device based on the address of the Application Function node (AF-2) associated with the relay communication device, the key request message including a relay service code;
receiving a key response message for discovery including a discovery key from the Application Function node (AF-2) associated with the relay communication device, the key response message for discovery being associated with the key request message for discovery;
transmitting an encrypted discovery message, the encrypted discovery message being encrypted using the discovery key;
receiving a direct communication request from a remote communication device, the direct communication request including a key identifier, ID;
obtaining a communication key corresponding to the key ID from the direct communication request; and
transmitting an encrypted direct communication response to the remote communication device, the encrypted direct communication response is encrypted using the communication key corresponding to the key ID.

12. The method of claim 11, wherein receiving the direct communication request comprises:
receiving an encrypted direct communication request; and
decrypting the encrypted direct communication request using the discovery key to provide the direct communication request.

13. The method of claim 11, wherein the direct communication request includes the relay service code.

14. The method of claim 11, wherein the direct communication request includes an address of an Application Function node (AF-1) associated with the remote communication device.

15. The method of claim 14, wherein obtaining the communication key comprises:
transmitting a key request message for communication to the Application Function node (AF-2) associated with the relay communication device in response to receiving the direct communication message, the key request message for communication including the key ID and the address of the Application Function node (AF-1) associated with the remote communication device; and
receiving a key response message for communication from the Application Function node (AF-2) associated with the relay communication device, the key response message including the communication key corresponding to the key ID.

16. The method of claim 14, wherein obtaining the communication key comprises:
transmitting a key request message for communication to the Application Function node (AF-1) associated with the remote communication device using the address of the Application Function node (AF-1) associated with the remote communication device in response to receiving the direct communication message, the key request message for communication including the key ID; and
receiving a key response message for communication from the Application Function node (AF-1) associated with the remote communication device, the key response message including the communication key corresponding to the key ID.

17. The method of claim 11, wherein the Application Function node (AF-2) comprises a proximity service key management function, PKMF.

18. The method of claim 11, wherein the encrypted discovery message comprises an encrypted discovery announcement message that is broadcast by the relay communication device.

19. The method of claim 11, further comprising receiving an encrypted discovery request message,
wherein receiving the encrypted discovery request message includes decrypting the encrypted discovery request message using discovery key,
wherein the encrypted discovery message comprises an encrypted discovery response message that is transmitted responsive to the encrypted discovery request message, and
wherein the encrypted discovery response message is encrypted using the discovery key.

20. The method of claim 11 further comprising:
relaying communication between the remote communication device and a Radio Access Network, RAN, node using the communication key for encryption between the remote communication device and the relay communication device,
wherein relaying the communication comprises at least one of:
receiving the communication as an encrypted communication from the remote communication device, decrypting the encrypted communication using the communication key, and transmitting the communication to the RAN node; and
receiving the communication from the RAN node, encrypting the communication using the communication key to provide an encrypted communication, and transmitting the encrypted communication to the remote communication device.

21. A method of operating an Application Function node (AF-1) associated with a remote communication device, the method comprising:
receiving a key request message for discovery from the remote communication device, wherein the key request message for discovery includes a relay service code;
obtaining a discovery key based on the relay service code included in the key request message for discovery;
transmitting a key response message for discovery including the discovery key to the remote communication device;
receiving a key request message for communication from the remote communication device, the key request message for communication including the relay service code;
obtaining a communication key and a key identifier, ID, for the communication key based on the relay service code;
transmitting a key response message for communication to the remote communication device, the key response message including the communication key and the key ID for the communication key;
receiving a key request message, the key request message including the key ID from an Application Function node (AF-2) associated with a relay communication device; and
transmitting a key response message including the communication key responsive to receiving the key request message including the key ID to the Application Function node (AF-2) associated with the relay communication device responsive to receiving the key request message including the key ID.

22. The method of claim 21, wherein obtaining the discovery key comprises deriving the discovery key internally based on the relay service code.

23. The method of claim 21, wherein obtaining the discovery key comprises,
transmitting a key request message to the Application Function node (AF-2) associated with the relay communication device responsive to receiving the key request message for discovery, the key request message including the relay service code; and
receiving a key response message from the Application Function node (AF-2) associated with the relay communication device, the key response message including the discovery key,
wherein transmitting the key request message comprises forwarding the key request message for discovery, and
wherein transmitting the key response message for discovery comprises forwarding the key response message.

24. A method of operating an Application Function node (AF-2) associated with a relay communication device, the method comprising:
receiving a key request message for discovery from the relay communication device, the key request message including a relay service code;
obtaining a discovery key based on the relay service code included in the key request message for discovery;
transmitting a key response message for discovery including the discovery key to the relay communication device
receiving a key request message for communication from the relay communication device, the key request message for communication including a key identifier, ID;

transmitting a key request message including the key ID to an Application Function (AF-1) associated with a remote communication device;

receiving a key response message including a communication key corresponding to the key ID from the Application Function (AF-1) associated with the remote communication device, the key response message corresponding to the key request message; and transmitting a key response message for communication including the communication key to the relay communication device responsive to receiving the key response message.

25. The method of claim 24, wherein obtaining the discovery key comprises deriving the discovery key internally based on the relay service code.

26. The method of claim 24, further comprising:

receiving a key request message from an Application Function node (AF-1) associated with the remote communication device, the key request message including the relay service code;

obtaining the discovery key based on the relay service code included in the key request message from the Application Function node (AF-1) associated with the remote communication device;

transmitting a key response message including the discovery key to the Application Function node (AF-1) associated with the remote communication device.

* * * * *